United States Patent
Krietzman

[11] Patent Number: 6,000,813
[45] Date of Patent: Dec. 14, 1999

[54] LASER POINTER WITH LIGHT SHAPING ROTATING DISK

[76] Inventor: Mark Howard Krietzman, 25550 Hawthorne Blvd., Ste. 101, Torrance, Calif. 90505

[21] Appl. No.: 08/918,513

[22] Filed: Aug. 21, 1997

Related U.S. Application Data

[60] Provisional application No. 60/034,074, Dec. 21, 1996, provisional application No. 60/040,857, Mar. 17, 1997, and provisional application No. 60/043,199, Apr. 16, 1997.

[51] Int. Cl.[6] .......................... G03B 23/10; F21K 27/00
[52] U.S. Cl. ...................... 362/259; 362/170; 353/110; 353/43
[58] Field of Search .................... 362/259, 169, 362/170, 202, 158; 353/42, 43, 62, 97, 63, 91, 106, 107, 110

[56] References Cited

U.S. PATENT DOCUMENTS

| | | | |
|---|---|---|---|
| 4,048,489 | 9/1977 | Giannetti | 362/223 |
| 4,527,223 | 7/1985 | Maglica | 362/187 |
| 4,779,176 | 10/1988 | Bornhorst | 362/223 |
| 5,317,348 | 5/1994 | Knize | 353/31 |
| 5,450,148 | 9/1995 | Shu | 353/42 |

*Primary Examiner*—Sandra O'Shea
*Assistant Examiner*—Marshall Honeyman
*Attorney, Agent, or Firm*—Mark Krietzman

[57] ABSTRACT

A portable or stationary light shaping system which can shape a variety of light sources via a series of selectable & moving output specific light shaping optical elements which produces a controlled and precise composite illumination of optical outputs.

22 Claims, 3 Drawing Sheets

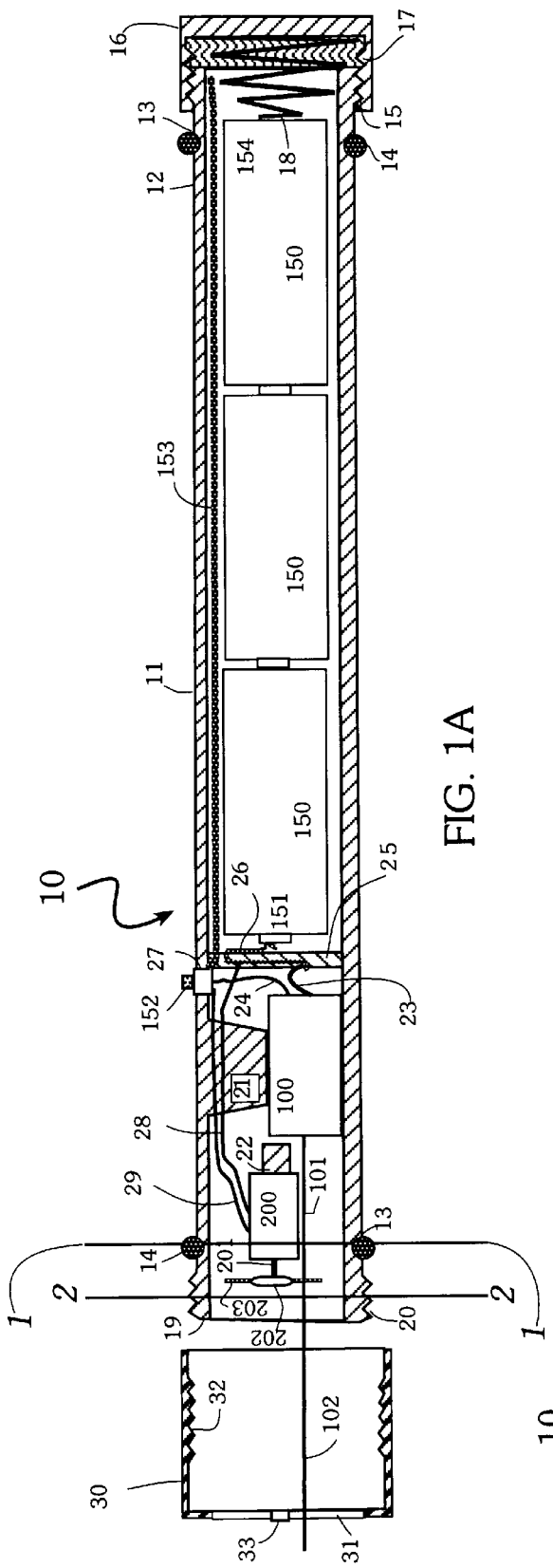
FIG. 1A
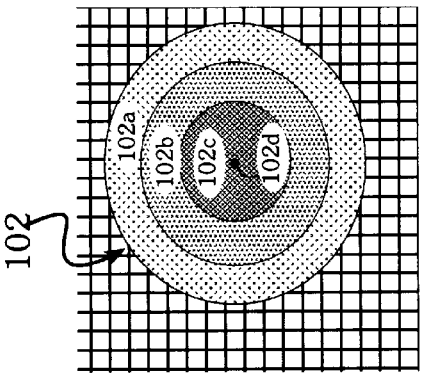
FIG. 1D
FIG. 1C
FIG. 1B

LASER POINTER WITH LIGHT SHAPING ROTATING DISK

RELATED APPLICATIONS

The within invention claims the benefits, under Title 35, United States Code 119 (e), of three Provisional Applications: 60/034,074, filed Dec. 21, 1996, 60/040,857, filed Mar. 17, 1997, and 60/043,199, filed Apr. 16, 1997.

BACKGROUND OF THE INVENTION

1. Technical Field of the Invention

This present invention relates to light shaping and more particularly to a device which produces a selectable composite illumination. The present invention relates to a novel light shaping system for use in illumination, scanning, targeting, surveillance, presentations, measurement, and communication.

2. Background

A light shaping system which directs a light source through a series of selectable & moving light shaping optical elements produces a controlled and precise composite illumination of overlaid optical outputs.

For hunting, targeting, military and police use the narrow wavelength obtained from a 635–690 nm laser emitting light source and the selectable controlled overlay of that light source, combined with a targeting spot or a cross hair provides an illumination with the safety of having little effect on reducing night vision, and improved, accuracy, alignment, targeting.

U.S. Pat. No. 5,450,148, issued to Shu et. al. teaches a laser pointer which providers fixed magnifying lens and patterning stencils, which are selectable, to project a static magnified diffuse laser output through a mask onto a screen in a pre-selected pattern.

U.S. Pat. No. 3,407,294, issued to Hill teaches the static redistribution diffusion of a collimated output to produce a useful red light for black & white photographic illumination. However, the static diffuse output lacks the illumination properties of a controlled composite illumination.

None of these solutions provide a simple portable, inexpensive durable light shaping system. None of these solutions provide laser illumination and laser targeting which allow the user to clearly see the target while at the same time accurately aim.

SUMMARY OF INVENTION

Accordingly, it is an object of the invention to provide a novel light shaping system.

It is yet another object of the invention to provide a novel moving light shaping system.

It is yet another object of the invention to provide a novel rotating light shaping system.

It is yet another object of the invention to provide a novel reciprocating light shaping system It is yet another object of the invention to provide a novel light shaping system to produce a series of overlaid on or off axis illuminating outputs which yield a composite illumination gradient.

It is yet another object of the invention to provide a novel moving light shaping system with a selectable series of discreet sub-elements which yield a composite diffuse illumination spot and central pin-point laser.

It is yet another object of the invention to provide a novel moving light shaping system with a selectable series of discreet sub-elements which yield a composite diffuse illumination spot and central laser cross-hair.

It is yet another object of the invention to provide a novel moving light shaping system for use with a plurality of selectable illumination sources.

It is yet another object of the invention to provide a novel laser emitting illumination & target acquisition system.

It is yet another object of the invention to provide a novel hand held or weapon mountable illumination & target acquisition system.

It is yet another object of the invention to provide a novel hand held or weapon mountable laser emitting illumination & target acquisition system.

It is yet another object of the invention to provide a novel submersible illumination system.

It is yet another object of the invention to provide a novel laser emitting illumination & target acquisition system with selectable output.

It is yet another object of the invention to provide a novel laser emitting illumination & target acquisition system with selectable on or off-axis composite diffuse output.

It is yet another object of the invention to provide a novel illumination & target acquisition system with a composite diffuse spot illumination and laser pin-point or cross hair.

It is yet another object of the invention to provide a novel illumination & target acquisition system with a composite of diffuse laser illumination and a laser pin-point or cross hair.

It is yet another object of the invention to provide a plurality of selectable illumination sources including multiple laser emitting sources producing outputs of different wavelengths visible and non-visible for use in varied situations.

The features of the invention believed to be novel are set forth with particularity in the appended claims. The invention itself, however, both as to configuration, and method of operation, and the advantages thereof, may be best understood by reference to the following descriptions taken in conjunction with the accompanying drawings.

BRIEF DESCRIPTION OF THE DRAWINGS

FIG. 1A illustrates a cut-away side assembly view of the preferred embodiment of the light shaping system.

FIG. 1B illustrates a cut-away front view of the preferred embodiment at line 1—1.

FIG. 1C illustrates a cut-away front view of the light shaping element of the preferred embodiment at line 2—2.

FIG. 1D illustrates a front view of the illumination output of FIG. 1A.

MODES FOR CARRYING OUT THE INVENTION

Figure 1F:
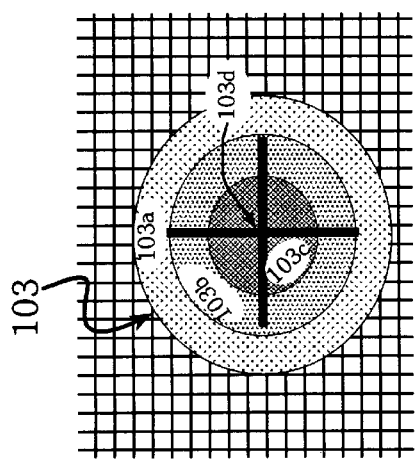
FIG. 1F illustrates a front view of the illumination output of FIG. 1E.

Referring now to the drawings, there is illustrated in FIG. 1A a cut-away assembly side view of the preferred embodiment of the light shaping system generally designated 10.

The generally tubular housing 11 is of a size and shape which allows the insertion of a plurality of batteries 150, a solid state laser diode 100 and a electric motor 200.

The batteries 150 are inserted into the rear of the housing 12. However, it is envisioned that an external power supply may be substituted for the batteries in the housing when the current required exceeds the useful capacity of the housing mounted batteries. The outer wall of the rear of the housing 12 is circularly groved 13 to secure a rubber or silicone O-ring 14 firmly in place and is also is coarsely threaded 15. An end cap 16, with internal threads 17, corresponding to the course threads 15, may be screwed over the rear of the housing 12 and over the O-ring 14 to seal the device 10. The rear-cap 16 also contains a contact spring 18 for controlling battery 150 contact with the laser emitting diode 100 and the electric motor 200. A one-way vent, not shown, may be added to the end cap to vent battery gases or a hydrogen scavenging catalyst may be added.

The outer wall of the front end of the housing 19 is circularly groved 13 to secure a rubber or silicone O-ring 14 firmly in place and is also is finely threaded 20. A series of diode mounts 21, which extend perpendicular from the internal wall of the housing 11, firmly hold a laser emitting diode 100 in place. A series of optical drive mounts 22, which extend perpendicular from the internal wall of the housing 11, firmly hold the electric motor 200 in place.

For the preferred embodiment one laser emitting diode 100 is mounted, however, it is envisioned that a plurality of selectable laser emitting diodes both visible spectrum and non-visible (for use with night vision devices) with varied wavelength and power output specifications may be mounted within the same housing 11. Laser emitting diodes are readily available and are known art. The diode comprises a laser beam module with a control circuit. Since the laser emitting diode is well known in the art, it is unnecessary to present a detailed statement of its construction in the present invention.

For the preferred embodiment a laser emitting source in the visible range is used. A compact source is a solid-state diode in the 532–690 nm range. Diode-pumped, CW diode, Q-switched diode, solid-state, solid-state CW, solid-state Q-switched, ion, gas, dye, or rare-earth element laser emitting sources may be used in place of the solid state diode when appropriate for the intended usage. For surveillance uses, search and rescue or other applications which use night vision or machine vision coupled with a non-visible spectrum illumination a laser emitting diode in the x-ray, ultraviolet or infrared spectrum may be substituted for the visible spectrum laser emitting diode.

Extending from the rear of the laser emitting diode 100 is a positive 23 and a negative 24 electrical lead wire. Within the housing 11 a bisecting internal wall 25 is affixed with a front battery contact 26. The front of the battery 151 is in contact with the front battery contact 26 and the positive lead wire 23 is connected to the front battery contact. The negative lead wire 24 is connected to an electrical switch 152, which is affixed through the housing 11 via the on/off switch guide 27. In the preferred embodiment a push button type on/off switch is used, however, it is envisioned that other types of switches, momentary switches well known in the art may be used.

The electrical switch 152 is also in contact with a contact strip 153, affixed axially within the housing 11, which contacts the rear contact spring 18 when the end cap 16 is attached.

The positive electrical lead 28 and the negative electrical lead 29 of the electric motor 200 are affixed to the on/off switch 152 and the front battery contact 26 in the same fashion as the laser emitting diode 100.

To seal the device 10 the rear-end cap 16 is affixed over the rear 12 of the housing 11, and a front cover 30 is attached over the front end 19 of the housing 11. Formed or affixed at the end of the front cover is a transparent lens 31. The front cover 30 is internally threaded with fine threads 32 corresponding to the finely threaded external wall 20 of the front end 19 of the housing 11. The front cover 30 is screwed over the front 19 of the housing 11 and over a silicone or rubber O-ring 14.

The electric motor 200 is affixed within the housing 11 via the optical drive mounts 22 above the line of fire of the laser emitting diode 100. A drive shaft 201 extends front the electric motor and is attached to a circular wheel 202 which is positioned between the laser output 101 and the front end of the housing 19. Formed around the circumference of the circular wheel 202 is a series of light shaping elements 203. When the laser output 101 passes through a light shaping element 203 it exits an altered laser output 102. Not shown is a secondary alteration of the altered laser output 102 which may be achieved by affixing one or more secondary light shaping elements 33 within the transparent lens 31 and selectively positioning the secondary element, (via rotating front cover 30), through the path of the altered laser output 102.

The light shaping element 203 is comprised of subelements (not shown) which when rotated through the laser output 101 will produce a composite illumination of altered laser outputs 102 corresponding to the optical characteristic of the light shaping element 203. When current is applied to the laser emitting diode 100 and the electric motor 200, the drive shaft 201 and circular wheel 202 with attached light shaping element 203 will rotate. When the rotational speed of the circular wheel 202 is at a rate beneath the visual threshold, the composite illumination of altered laser outputs 102 resulting from the passage of the laser output 101 through the rotating light shaping element 203 will appear to strobe. When the rotational speed of the circular wheel 202 is at a rate above the visual threshold, the composite illumination of altered laser outputs 102 resulting from the passage of the laser output 101 through the rotating light shaping element 203 will appear substantially nonstrobbing.

Although a class IIIB laser producing a static output above 5 mW but less than 500 mW, at a wavelength between 400–710 nm, has not been intended for general consumer use because its output energy exceeds the class IIIA limit of <5 mW for a wavelength between 400–710 nm, when the laser illumination and targeting device does not include a unaltered pin-point laser output, the milli-wattage of the laser may be somewhat higher, (and still fall within the class IIIA), to be determined by the measurement of the most concentrated laser output exiting the light shaping element 203 in accordance with FDA measurement standards specified at 21 CFR 1040.10-11 and subject to FDA approval.

Referring now FIG. 1B, there is illustrated a cut-away front view, along line 1—1, of the preferred embodiment of the light shaping system generally designated 10.

The laser emitting diode 100 is positioned via the diode mounts 21 within the housing 11 off-axis and parallel to the electric motor 200 to ensure that the laser output 101 is unobstructed in its passage forward. The electric motor 200 is positioned parallel to the diode 100 via optical drive mounts 22. It is envisioned that to further compact the device the laser emitting source may be positioned directly in line with the electric motor 200 and a series of reflective mirrors may be used to direct the laser output around the electric motor and through the light shaping element 203.

Referring now FIG. 1C, there is illustrated a cut-away front view, along line 2—2, of the preferred embodiment of the light shaping element 203 of the light shaping system.

The light shaping element is formed around the circular wheel 202 is non-homogeneous and may provide a constantly varying surface which will optically alter the wave form of the laser output (not shown); or as shown, a plurality of discreet sub-elements 203a–203d to optically alter the wave form of the laser output. Each sub-element 203a–203d is large enough for the laser output 101 to pass through.

The components, and the composite of the components forming the altered laser output (not shown) are shaped according to the specific characteristics of the discreet sub-elements 203a–203d.

Materials choices for the discreet sub-elements 203a–203d including convex lenses, concave lenses, conical lenses, magnifying lenses, condensing lenses, Fresnel lenses, diffusion lenses, interference pattern generating gratings, cross-hair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers all yield controllable and selectable component and composite results.

In the preferred embodiment 10 the discreet sub-elements 203a–203d provide a sequential series of, and one or more clear windows, diffusion filters ranging from a fan angle of 0.25 degrees to 90 degrees depending on the application. For long range targeting a sequential series of one or more clear windows and smaller fan angles in the 0.25–10 degrees range is used. For area illumination larger fan angles provide a larger area of illumination.

Referring now to FIG. 1D, there is illustrated a front view of the altered laser output produced by the preferred embodiment generally designated 102.

The altered laser output 102 is a composite of overlaid sequences of illumination 102a–102d resulting from the passage of the laser output 101 through the rotating light shaping element 203, when the rotating light shaping element 203 is rotated at a speed beneath the visual threshold, the composite of overlaid sequences of illumination 102a–102d will appear to strobe; at a rotational speed above the visual threshold the composite illumination output 102 will appear substantially non-strobbing.

Figure 1E:
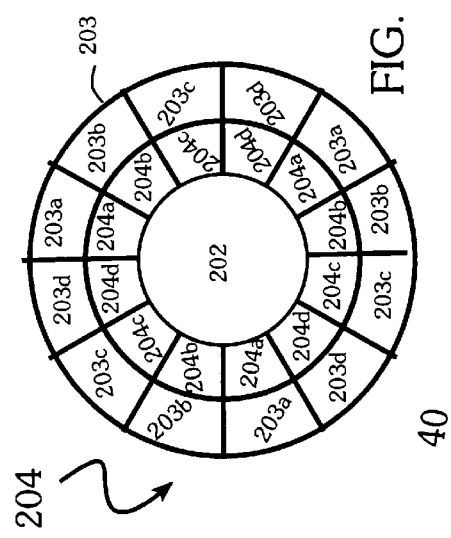
FIG. 1E illustrates a front view at line 2—2 of an alternate embodiment of the of the light shaping element of FIG. 1C.

Referring now FIG. 1E, there is illustrated a front view of an alternate embodiment of the light shaping element 203 along 2—2 of the preferred embodiment generally designated 204.

The light shaping element 204 contains two or more non-homogeneous concentric rings and may provide a constantly varying surface which will optically alter the wave form of the laser output (not shown); or as shown, a plurality of discreet sub-elements 203a–203d & 204a–204d will optically alter the wave form of the laser output.

The components of illumination, and the composite of the components forming the altered laser output (not shown), are shaped according to the specific characteristics of the discreet sub-elements 203a–203d & 204a–204d.

Material choices for the sub-elements 203a–203d & 204a–204d include convex lenses, concave lenses, conical lenses, magnifying lenses, condensing lenses, Fresnel lenses, diffusion lenses, interference pattern generating gratings, cross-hair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers all yield controllable and selectable component and composite results.

In this embodiment 204 the discreet sub-elements 204a–204d provide a sequential series of cross-hair interference pattern generating gratings and diffusion filters ranging from a fan angle of 0.25 degrees to 10 degrees. Not shown is the mechanism by the laser output, is directed at the selected concentric ring of discreet sub-elements. The selection may be accomplished by either moving the diode relative to the selected concentric circle of discreet sub-elements, or by using a two or more reflective parallel mirrors to steer the laser output. Movement of laser light via reflection is well known in the art and it is unnecessary to present a detailed statement of its construction in the present invention.

Referring now to FIG. 1F, there is illustrated a front view of the spot output produced the FIG. 1E, generally designated 103.

The output 103 is a composite of overlaid sequences of variable diffuse illumination and cross-hair pattern 103a–103d resulting from the passage of the laser output 101 through the rotating light shaping element 204.

Figure 2A:
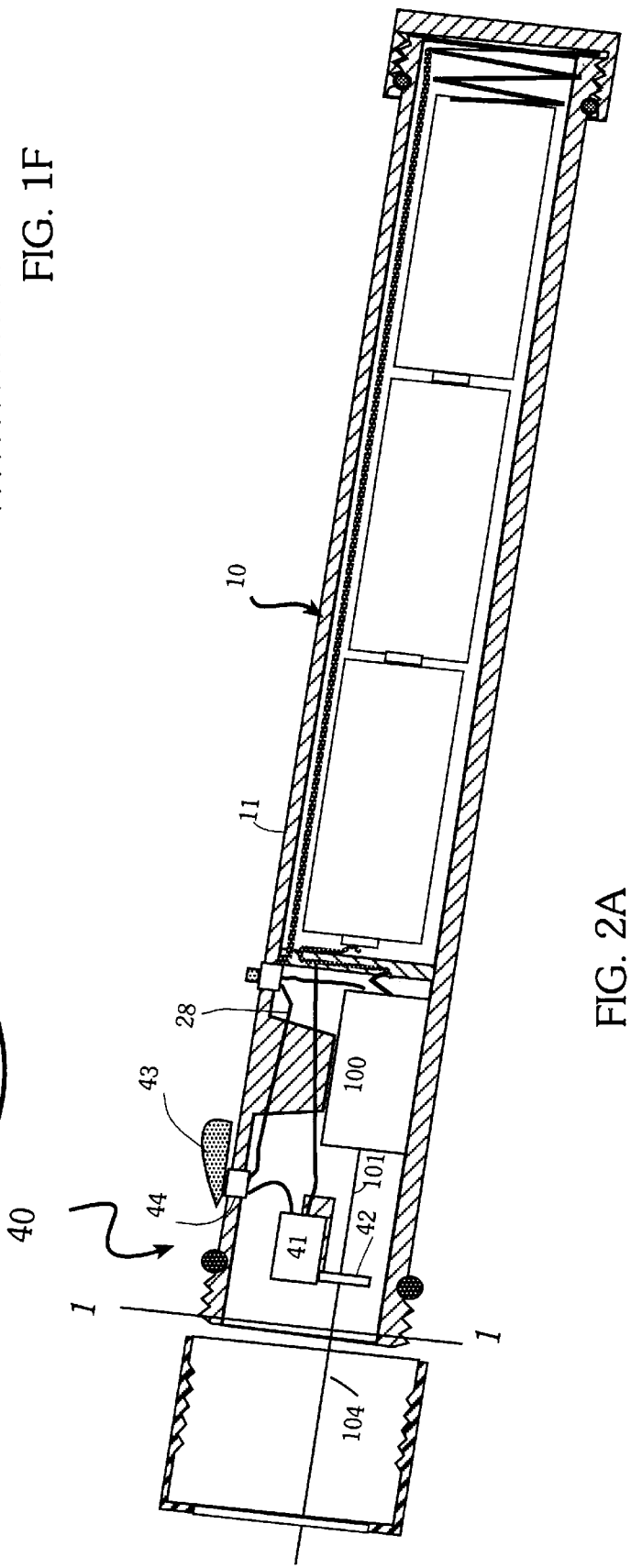
FIG. 2A illustrates a cut-away side assembly view of an alternate embodiment of the light shaping system.

Referring now to FIG. 2A a cut-away assembly side view of an alternate embodiment of the light shaping system generally designated 40. This embodiment incorporates all of the features of the preferred embodiment except that the electric motor, and the circular wheel with light shaping element attached are replaced by a galvanometer with control circuit 41 and a arch shaped light shaping element 42 is affixed to the moving member of the galvanometer. The galvanometer with current oscillation control circuit is well known in the art, it is unnecessary to present a detailed statement of its construction in the present invention.

A variable current galvanometer control switch 43 is affixed through the housing 11 via the control switch guide 44. In this embodiment a rotating variable current switch is used, however, it is envisioned that other types of control switches, all well known art, may be used.

The galvanometer control switch 43 is connected to the positive 28 and negative 29 lead wires. The arch shaped light shaping element 42 affixed to the moving member of the galvanometer is positioned perpendicular to the laser output 101. When current is incrementally supplied to the galvanometer 41 the control circuitry controls the oscillation of the current and the pendulation of the moving member of the galvanometer and the attached arch shaped light shaping element 42 across the path of the laser output 101. The arch shaped light shaping element 42 is comprised of sub-elements (not shown) and when the sub-elements pendulate through the laser output 101 it will produce a composite laser output 104 determined by the optical characteristic of the light shaping element 42 and the rate of pendulation.

Figure 2B:
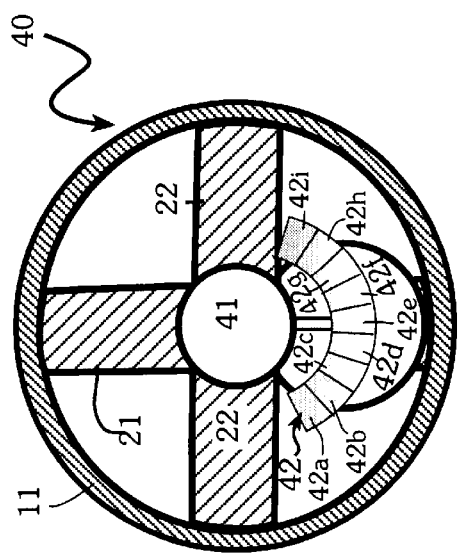
FIG. 2B illustrates a cut-away front view of the embodiment of FIG. 2A at line 1—1.

Referring now FIG. 2B, there is illustrated a cut-away front view, along line A—A, of the embodiment of the light shaping system of FIG. 2A, generally designated 40.

The laser emitting diode 100 is positioned via the diode mounts 21 within the housing 11 off-axis and parallel to the galvanometer 41 to ensure that the laser output 101 is unobstructed in its passage forward. The galvanometer 41 is positioned parallel to the diode 100 via optical drive mounts 22. It is envisioned that to further compact the device the laser emitting source may be positioned directly in line with the galvanometer 41 and a series of reflective mirrors may be used to direct the laser output around the electric motor and through the light shaping element 42.

The light shaping element 42 is non-homogeneous and may provide a constantly varying surface which will optically alter the wave form of the laser output (not shown); or as shown, a plurality of discreet sub-elements 42a–42i will optically alter the wave form of the laser output. Each sub-element 42a–42i is large enough for the diameter of the laser output 101 to pass through.

The components of illumination, and the composite of the components forming the altered laser output (not shown), are shaped according to the specific characteristics of the discreet sub-elements 42a–42i.

Material choice for said sub-elements 42a–42i include convex lenses, concave lenses, conical lenses, magnifying lenses, condensing lenses, Fresnel lenses, diffusion lenses, interference pattern generating gratings, cross-hair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers all yield controllable, selectable results.

In this embodiment a horizontal scanning illumination and targeting output is produced by the sub-elements 42a–42i. The sub-elements 42a–42i provide a series of asymmetrical off-axis diffusion filters ranging from a fan angle of 0.25 degrees to 60 degrees and an off "X"-axis orientation of between −10 and +10 degrees depending on the application; for long range illumination a series smaller fan angles between 0.25–10 degrees and smaller off-axis angles in the +5 to −5 degree range are used.

For this embodiment the center sub-element 42e is an open window which allows unaltered passage of the laser output. The next two adjacent sub-elements 42d & 42f are diffusion elements with a 0.25 to 5 degree fan angle and 0 degrees off-axis. The next two adjacent sub-elements 42c & 42g are diffusion elements with a 0.25 to 5 degree fan angle and are +1 & −1 degree off axis respectively, the next two adjacent sub-element 42b & 42h are diffusion elements with a 0.25 to 5 degree fan angle and are +3 & −3 degrees off axis respectively. The end two sub-elements 42a & 42i are diffusion elements with a 0.25 to 5 degree fan angle and are +5 & −5 degrees off axis respectively.

Increasing the current applied to the galvanometer 41 current oscillation control circuitry will yield increased pendulation of the arch shaped light shaping element 42 whereby a greater range of sub-elements 42a–42i are pendulated through the laser output 101. Conversely, reducing the current will decrease the range of pendulation of the sub-elements 42a–42i.

Figure 2C:
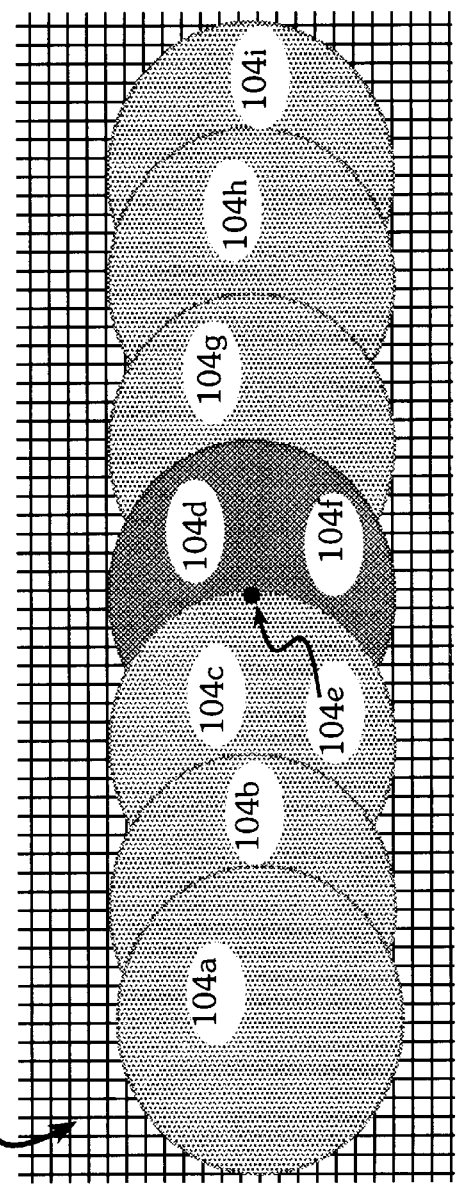
FIG. 2C illustrates a front view of the illumination output of FIG. 2A.

Referring now to FIG. 2C, there is illustrated a front view of the output produced the FIG. 2A generally designated 104.

The output 104 is a composite of overlaid sequences of variable diffuse illumination, some off-axis 104a–d & 104f–i and an unaltered pin-point laser output 104e, resulting from the passage of the laser output 101 through the sub-elements 42a–42i of the arch shaped light shaping element 42 pendulation through the laser output.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. An electro-optical device for shaping light, comprising:
   (a) a power supply;
   (b) a switchable electromagnetic means with a movable member connected to said power supply;
   (c) a switchable illumination producing source connected to said power supply;
   (d) an illumination;
   (e) an optical means for shaping said illumination affixed to said movable member, whereby said electromagnetic means transports said movable member and attached optical means through the path of said illumination at a rate of speed beyond the threshold of visual acuity;
   (f) a one or more shaped illuminations passing from said optical means when said switchable illumination producing source and said switchable electromagnetic means are "on; and,
   (g) a composite shaped illumination, resulting from the overlay of said one or more shaped illumination.

2. An electro-optical device for shaping light according to claim 1, wherein said illumination producing source is one or more lasers emitting sources and said illumination is a laser output.

3. An electro-optical device for shaping light according to claim 1, wherein said illumination producing source is a light bulb and further comprising one or more collimating elements placed in-between said light-bulb and said optical means.

4. An electro-optical device for shaping light according to claim 1, wherein said illumination producing source is a light emitting diode.

5. A electro-optical device for shaping light according to claim 1, wherein said optical means further comprises one or more illumination altering sub-elements with pre-determined optical characteristics.

6. A electro-optical device for shaping light according to claim 1, wherein said optical means further comprises one or more illumination altering non-homogeneous continuous surfaces with pre-determined optical characteristics.

7. A electro-optical device for shaping light according to claim 2, wherein said optical means further comprises one or more illumination altering sub-elements with pre-determined optical characteristics.

8. A electro-optical device for shaping light according to claim 2, wherein said optical means further comprises one or more illumination altering non-homogeneous continuous surfaces with pre-determined optical characteristics.

9. A electro-optical device for shaping light according of claim 7, wherein one or more of said sub-elements is selected from the group consisting of convex lenses, concave lenses, conical lenses, magnifying lenses, condensing lenses, Fresnel lenses, diffusion lenses, interference pattern generating gratings, cross-hair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers.

10. A electro-optical device for shaping light according of claim 8, wherein one or more portions of said illumination altering non-homogeneous continuous surfaces is selected from the group consisting of convex lenses, concave lenses, conical lenses, magnifying lenses, condensing lenses, Fresnel lenses, diffusion lenses, interference pattern generating gratings, cross-hair generator lens, straight line generator lenses, pattern generator lenses, diffractive pattern generators, holographic diffusers, optical diffusion glass, optical diffusion plastic, diffusion filters, circular diffusers, elliptical diffusers, off-axis lenses, off-axis holographic filters, or off-axis holographic diffusers.

11. A electro-optical device for shaping light according to claim 2, wherein said switchable electromagnetic means is an electric motor and said movable member is a drive shaft extending from and affixed to said optical means, whereby said optical means is transported in a rotational motion around said drive shaft.

12. An electro-optical device for shaping light according to claim 2, wherein said switchable electromagnetic means is a galvanometer connected to an oscillating control circuity, and said movable member is a needle extended therefrom, whereby increasing the current to said galvanometer will increase the pendulation of said optical means.

13. An electro-optical device for shaping light according to claim 5, wherein said sub-elements are diffusion elements of varying diffusion characteristic whereby said one or more shaped illuminations are representative of the varying characteristics of each of said sub-elements and said composite shaped illumination is representative of the overlay of each of said one or more illuminations.

14. An electro-optical device for shaping light according to claim 7, wherein said sub-elements are diffusion elements of varying diffusion characteristic whereby said one or more shaped illuminations are representative of the varying characteristics of each of said sub-elements and said composite shaped illumination is representative of the overlay of each of said one or more illuminations.

15. An electro-optical device for shaping light according to claim 7, wherein said sub-elements are a series of circular diffusers of varying fan angles and one or more clear lenses whereby said predetermined shaping of laser output is a substantially circular diffuse laser illumination with a central pin-point spot.

16. An electro-optical device for shaping light according to claim 7, wherein said sub-elements are a series of circular diffusers of varying fan angles and one or more cross hair generator lenses whereby said predetermined shaping of laser output is a substantially circular diffuse laser illumination with a central cross hair.

17. An electro-optical device for shaping light according to claim 5, wherein said sub-elements are a series of circular off-axis diffusers of varying off-axis angles and one or more clear lenses whereby said predetermined shaping of laser output is a central laser pin-point and a area of diffuse illumination.

18. An electro-optical device for shaping light according to claim 7, wherein said sub-elements are a series of circular off-axis diffusers of varying off-axis angles and one or more clear lenses whereby said predetermined shaping of laser output is a central laser pin-point and a area of diffuse illumination.

19. A method of producing a shaped illumination comprising the steps of:

(a) Mounting a light shaping optical element with predetermined optical characteristics to a movable member;

(b) Placing said optical element in the path of a narrow beam of light;

(c) Thereafter continually moving said movable member and mounted optical element through the path of said light at a rate of speed beyond the threshold of visual acuity and shaping said light passing through said optical element; and, (d) Thereafter aiming said shaped light at a target.

20. A method according to claim 19, wherein said moving steps includes applying a rotational electromagnetic force to said movable member and the movement of said optical element is rotational.

21. A method according to claim 19, wherein said moving steps includes applying a oscillating electromagnetic force to said movable member and the movement of said optical element is pendulating.

22. A laser illumination and targeting device, comprising:

(a) a power supply;

(b) a switchable electromagnetic means with a movable member connected to said power supply;

(c) a switchable laser emitting source connected to said power supply;

(d) a laser output;

(e) one or more optical means for shaping said illumination affixed to said movable member, whereby said electromagnetic means transports said movable member and attached optical means through the path of said laser output and at a rate of speed beyond the threshold of visual acuity;

(f) one or more shaped illuminations passing from said optical means when said switchable illumination producing source and said switchable electromagnetic means are "on;

(g) a composite shaped illumination, resulting from the overlay of said one or more shaped illumination;

(h) a first reflecting mirror affixed within said casing and in front of said laser output at a 45 degree angle whereby said laser output will be reflected at a right angle;

(i) a second reflecting mirror affixed to a sliding switch, limited to linear movement, and positioned at an opposite 45 degree angle from said first reflecting mirror, whereby said laser output will again be reflected at a right angle and be directed in parallel with the unreflected laser output; and, (j) a sliding switch guide formed axially through said casing which allows for adequate linear movement of said second reflecting mirror to direct said reflected laser output through a selected one of said optical means.

* * * * *